Feb. 10, 1959  H. S. BROWN ET AL  2,873,168
RECOVERY OF PU FROM CERIUM TRIFLUORIDE BY FLUORINATION
Filed Feb. 27, 1945
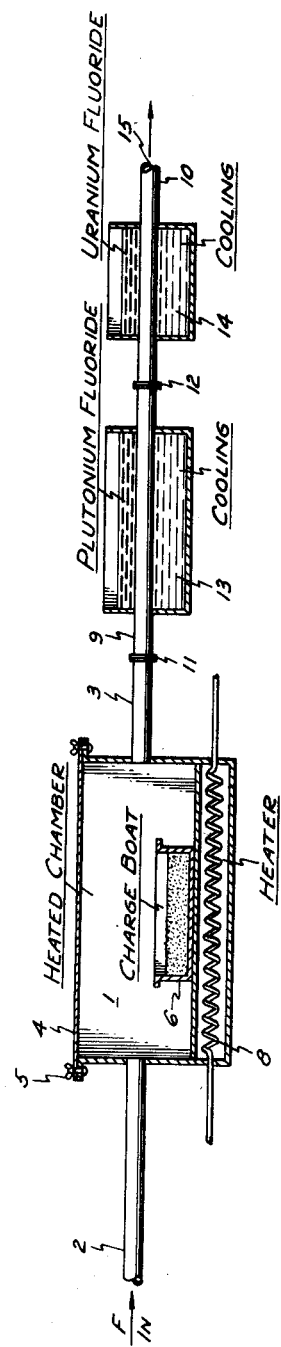
INVENTORS
Harrison S. Brown
Edward G. Bohlmann
BY United States Patent Office 2,873,168
Patented Feb. 10, 1959

2,873,168

RECOVERY OF Pu FROM CERIUM TRIFLUORIDE BY FLUORINATION

Harrison S. Brown and Edward G. Bohlmann, Oak Ridge, Tenn., assignors to the United States of America as represented by the United States Atomic Energy Commission Application February 27, 1945, Serial No. 580,047

6 Claims. (Cl. 23—14.5)

This invention relates to a method involving the use of fluorination for the concentration and recovery of Pu or associate elements. More particularly, this invention concerns a separatory and concentration process for isolating Pu from fission products and the like extraneous matter by a combination of steps involving the formation of certain carrier precipitates and the fluorination treatment thereof to concentrate and isolate plutonium.

As disclosed at other places, as for example in the several pending applications to be referred to hereinafter, plutonium or element 94 is a relatively recently produced and studied material.

As described herein, the isotope of element 94 having a mass of 239 is referred to as $94^{239}$ and is also called plutonium, symbol Pu. In addition, the isotope of element 93 having a mass of 239 is referred to as $93^{239}$. Reference herein to any of these elements is to be understood as denoting the element generically, whether in its free state or in the form of a compound, unless indicated otherwise by the context.

Elements 93 and 94 may be obtained from uranium by various processes which do not form a part of the present invention including irradiation of uranium with neutrons. Neutron irradiated uranium may be prepared by reacting uranium with neutrons from any suitable neutron source, but preferably the neutrons used are obtained from a chain reaction of neutrons with uranium.

Naturally occurring uranium contains a major portion of $_{92}U^{238}$, a minor portion of $_{92}U^{235}$, and small amounts of other substances such as $UX_1$ and $UX_2$. When a mass of such uranium is subjected to neutron irradiation, particularly with neutrons of resonance or thermal energies, $_{92}U^{238}$ by capture of a neutron becomes $_{92}U^{239}$ which has a half life of about 23 minutes and by beta decay becomes $93^{239}$. The $93^{239}$ has a half life of about 2.3 days and by beta decay becomes $94^{239}$. Thus, neutron irradiated uranium contains both $93^{239}$ and $94^{239}$ but by storing such irradiated uranium for a suitable period of time, the $93^{239}$ is converted almost entirely to $94^{239}$.

In addition to the above-mentioned reaction, the reaction of neutrons with fissionable nuclei such as the nucleus of $U^{235}$ results in the production of a large number of radioactive fission products. As it is undesirable to produce a large concentration of these fission products which must, in view of their high radioactivity, be separated from the $94^{239}$ and further as the weight of radioactive fission products present in neutron irradiated uranium is proportional to the amounts of $93^{239}$ formed therein, it is preferable to discontinue the irradiation of the uranium by neutrons when the combined amount of $93^{239}$ and $94^{239}$ is equal to approximately 0.02 percent by weight of the uranium mass. At this concentration of these substances, the concentration of fission elements which must be removed is approximately the same percentage.

As described above, there are certain extraneous materials present as a result of its method of manufacture. Dependent upon the type of use to which the Pu is to be employed or the derivatives to be prepared therefrom, it may be desirable to eliminate a substantial part or all of these various contaminants.

A number of processes have already been proposed for accomplishing separation and recovery of Pu. One of these processes which is in successful use is generically known as the bismuth phosphate type of process. Another type of process which is useful in treating Pu for decontamination and the recovery of Pu is known as the wet fluoride type of process. These processes are the invention of others and the details thereof are described in copending applications. For example, reference may be made to application Serial No. 519,714, now U. S. Patent No. 2,785,951, issued on March 19, 1957, to be referred to in further detail hereinafter, which describes the aforementioned type of processes. Consequently, all of the details respecting such processes are not described herein.

Likewise, a number of processes involving the use of fluorination in the treatment and separation of Pu have been described as for example, copending application Ser. No. 474,063, now U. S. Patent No. 2,833,617, issued on May 6, 1958, in which Harrison S. Brown, one of the herein-named inventors is a joint inventor with Glenn T. Seaborg. While the present invention resembles in some general respects certain of the features of the type processes disclosed in the copending applications aforementioned, the present invention constitutes different and improved procedure. That is, as the description proceeds it will be noted that the present invention involves the use of fluorination in the treatment of certain species of material to recover plutonium therefrom.

Because of the admixture of the plutonium with a large amount of extraneous material, such as fission products or the like radioactivity some of which tends to follow the plutonium through processing, it is apparent that the separation of the plutonium from the activity presents a considerable problem. We have found, however, that in accordance with the present invention plutonium containing materials contaminated by fission products and other extraneous matter may be processed by standard carrier precipitate procedure, for example, concluding with the formation of a cerium trifluoride carrier precipitate. This precipitate may then be treated by the fluorination steps described herein in detail, involving alternate reduction, to obtain the separation and recovery of plutonium.

The meaning of the terms carrier precipitation, extraneous material, radioactivity, product, by-product precipitation, and various other terms will be further apparent as the description proceeds.

This invention has for one object to provide a method for the separation and recovery of plutonium.

Another object is to provide a recovery method involving the use of certain carrier precipitation steps coupled with fluorination steps.

Still another object is to provide a procedure for isolating plutonium as a fluoride from extraneous material.

A still further object is to provide a fluorination method for treating compact material containing plutonium by means of steps including reduction whereby the fluorination is facilitated.

Still another object is to provide a method of fluorination applied to a cerium carrier precipitate containing Pu for removing Pu therefrom.

Another object is to provide suitable apparatus for carrying out the aforementioned methods.

Other objects will appear hereinafter.

For a more complete understanding of the invention, reference will be made to the attached drawing forming part of the present application. The drawing constitutes a semi-diagrammatic side elevation view somewhat in the nature of a flow sheet for illustrating one apparatus arrangement which may be employed for carrying out the procedures described herein.

Referring to the drawing, an inclosed heated chamber is indicated at 1. This chamber may be of any common configuration such as for example a small metal chemical reaction vessel provided with an inlet 2 and an outlet 3. Also, the interior thereof should be comprised of or lined with fluorine resistant metal or other type construction to resist the action of the fluorine gas. That is, Monel metal, Ni, Cu, fluorinated metal surfaces, or other compositions for resisting the action of fluorine may be used. In the embodiment shown, the chamber is provided with removable head 4 adapted to be held in place by the wing nuts 5. It is, of course, understood that the head is suitably fitted or by means of gasketing, forms a reasonably gas-tight closure. The purpose of the removable head is so that a charge boat 6 may be inserted into the interior of the chamber.

This charge boat 6 may be of any desired shape such as a small shallow pan constructed of Monel metal. The materials to be treated, namely the cerium fluoride precipitate carrying Pu, is placed in the pan and the charge inserted in the chamber. A heating means diagrammatically indicated at 8 is in a heat conducting association with the chamber. This heating means may comprise electrical heaters suitably encompassing the chamber, or gas burners, chemical salt baths or the like may be employed.

The outlet from the chamber may constitute an ordinary Monel metal conduit either straight or coiled, preferably in sections such as indicated at 9 and 10. Conventional joints are provided at 11 and 12.

The respective sections are inclosed in cooling boxes as designated at 13 and 14. These boxes may be double walled containers, in the nature of thermos or Dewar flasks, adapted to contain cooling mixtures exemplified by ice, or Dry Ice and acetone if relatively low temperatures are desired, or other cooling components such as circulated refrigerants may be used.

The outlet 15 may be connected with alkali scrubbers or other devices of such type for collecting or cleaning up the effluent vapors. The particular construction is not a limitation on the present invention as the vapors may be vented to a stack or hood for discharge to the atmosphere.

We have found that various materials containing plutonium may be processed by the present invention. For example, nitric acid solutions obtained by dissolving plutonium containing materials therein may be processed by a series of carrier precipitation steps, the last stage of the series involving a carrier precipitation comprising cerous trifluoride. This fluoride precipitate after separation by filtering or centrifugation is dried, for example, by passing dry HF thereover and is then subjected to alternate fluorinations at, for example, between 500° C. and 600° C. and reduction treatments at lower temperature. In this fluorination treatment the plutonium reacts with the fluorine to form a higher plutonium fluoride. The reduction treatment presumably may alter the crystal structure of the cerous fluoride precipitate remaining, thereby facilitating formation and volatilization of the plutonium in the fluorination step. Any uranium present in the carrier during fluorination will be converted to volatile uranium hexafluoride which will pass over with the plutonium fluoride, but will not be condensed under the same conditions employed in condensing the plutonium fluoride.

The details respecting the aforementioned series of carrier precipitation steps are not a limitation on the present invention. Any of the preliminary treatments such as by means of bismuth phosphate carriers or other standard procedures may be applied. However, for the purposes of general illustration there is described below a bismuth phosphate cycle as well as a cycle of forming cerium fluoride carrier.

Considering now these aspects in greater detail, an illustration of extraction and decontamination by the bismuth phosphate type of procedure is now described. While the Pu containing material may be preliminarily subjected to extraction and decontamination by any suitable process, a preferred process is that described in application Ser. No. 519,714 aforementioned, filed January 26, 1944, Thompson and Seaborg, now Patent No. 2,785,951 issued on March 19, 1957, an embodiment of which is as follows: Neutron irradiated uranium is dissolved in a suitable quantity of 60–70% nitric acid. This gives a uranyl nitrate hexahydrate (UNH) solution containing Pu. The solution is subjected to treatment with a reducing agent such as $H_2O_2$, oxalic acid or the like in excess for a period of about one hour at a temperature from 50° C. to 75° C. whereby any of the Pu which may have been oxidized to the $Pu^{(o)}$ state in the solution step is reduced to the $Pu^{(r)}$ state. The concentration of the solution in the UNH is adjusted to 20% and $H_2SO_4$, fluosilicic acid or the like is added to make the solution 1 N therein. To the solution is now added a source of bismuth ion to provide a concentration of bismuth ion equivalent to 10 grams of $Bi^{+3}$ ion in four liters of 20% UNH; phosphoric acid is also added to make the solution .36 M therein, and a precipitate comprising $BiPO_4$ which carries the $Pu^{(r)}$ comes down and is separated from the solution by filtration or centrifugation. Various other concentrations of bismuth and phosphoric acid described in copending applications may be used. The $BiPO_4$ precipitate carrying the $Pu^{(r)}$ is dissolved in 10 N $HNO_3$. The acidity of the solution is reduced to 6 N $HNO_3$ by dilution and the solution made .1 M in $K_2Cr_2O_7$ or other suitable oxidizing agent. On heating the solution at 95° C. for 2.25 hours, the plutonium is oxidized to the $Pu^{(o)}$ state. The solution is then diluted to 1 N acidity by addition of water and $H_3PO_4$ added to provide a suitable concentration for causing the formation of a $BiPO_4$ precipitate. The solution is heated to about 90° C. whereupon $BiPO_4$ precipitates carrying fission products but not $Pu^{(o)}$. The precipitate may be removed by filtration or centrifugation and discarded. If repetition of the cycle is contemplated for further decontamination, the $Pu^{(o)}$ in the filtrate is reduced by passing in a rapid stream of $SO_2$ gas for five minutes or by other reduction and allowing the solution to stand for approximately one hour and the cycle is suitably repeated.

The fluoride type of procedure referred to is now briefly described:

The plutonium-containing solution with the plutonium in the reduced state, $Pu^{(r)}$ is acidified by adding nitric acid to make the solution .8 to 1.3 N therein. To this solution there is now added a source of cerium ion, for example, an aqueous solution of cerium nitrate containing about one percent cerium ammonium nitrate to provide a concentration of cerium ions equivalent to 50–250 milligrams $Ce^{+++}$ per liter of solution. The solution is then treated with hydrogen fluoride as 48% HF or other suitable source of fluoride ion to make the solution about .5 to 1 N therein and to cause formation of a precipitate comprising cerous fluoride. This cerous fluoride precipitate carries the plutonium in the reduced condition and may be separated by centrifugation or other procedure. The cerous fluoride type of treatment per se and its details of operation forms no part of the present invention as various other concentrations or procedures may be applied, but is merely described for illustrating a treatment which may be used.

In accordance with the present invention it has been found that concentration of plutonium from $CeF_3$ by dry processing may be accomplished. As indicated it is known that CeF$_3$ carries plutonous fluoride both at low and high concentrations of plutonium. It has been discovered that the volatilization of plutonium from CeF$_3$ with fluorine is more satisfactory than from certain other fluoride carriers because of the reaction $$2CeF_3 + F_2 \rightarrow 2CeF_4$$

It appeared that during the conversion of CeF$_3$ to CeF$_4$ the crystal structure is altered sufficiently to facilitate the formation and volatilization as the higher fluoride of the enclosed plutonium in the carrier precipitate. Furthermore, the CeF$_4$ could then be reduced to CeF$_3$ with hydrogen and the fluorination repeated.

The initial data obtained in runs on one gram samples of CeF$_3$ containing from 1,000 to 10,000 counts per minute of Pu per gram are summarized below. This is a concentration of Pu in Ce of the order of .01–.1 p. p. m. However, the process may be applied to material in which the concentration of Pu is about 100 p. p. m. and also on cerous fluoride precipitate in which the amount of Pu is very much larger. The larger amounts appear easier to remove than the smaller. Hence, the process may be applied to the recovery of from 60%–85% of small, or tracer amounts to substantially complete recovery where the Pu constitutes ½% or more, by weight of the precipitate.

The runs were carried out in apparatus such as described in the attached drawing.

*Example I*

One treatment of cerous fluoride carrier precipitate with F$_2$.

| Run | Temperature (° C.) | Time (Hours) | Percent Pu Recovery |
|---|---|---|---|
| a | 650 | 1 | 35 |
| b | 550 | 1 | 90 |
| c | 500 | 1½ | 45 |
| d | 500–600 | 2 | 62 |
| e | 590 | 3 | 52 |
| f | 580–625 | 3 | 69 |

*Example II*

Two fluorinations; the precipitate was powdered with a mortar and pestle between treatments.

| Run | Temperature (° C.) | Time (Hours) | Percent Pu Recovery |
|---|---|---|---|
| a | 500–600 | 2 | 62 |
| b | 600 | 1½ | 23 |
| (Total) | | 3½ | 85 |

*Example III*

Two fluorinations; the precipitate was powdered with a mortar and pestle between treatments.

| Run | Temperature (° C.) | Time (Hours) | Percent Pu Recovery |
|---|---|---|---|
| a | 500 | 1 | 45 |
| b | 550 | 1½ | 23 |
| (Total) | | 2½ | 68 |

*Example IV*

Three fluorinations with reduction by hydrogen between treatments.

| Run | Temperature (° C.) | Time (Hours) | Percent Pu Recovery |
|---|---|---|---|
| a | 575–600 | 3 | 52 |
| b | 540 | 1½ | 19 |
| c | 550 | 1½ | 14 |
| (Total) | | 5½ | 85 |

From the foregoing data it may be seen that it is possible to remove 85% or more of the plutonium from CeF$_3$ by F$_2$—H$_2$ treatments. By a consideration of Example IV with Examples II and III where mechanical disintegration of the precipitate was carried out it may be seen that the reduction treatment facilitates subsequent fluorination. It should be remembered that the concentration of plutonium in the cerium fluoride in the above runs was relatively small. In many materials which may be processed by the present invention the plutonium concentration is 10$^3$–10$^4$ or more times greater than that used here and the percentage removed would be higher than that indicated from the present runs. However, the foregoing shows difficultly recoverable small amounts of Pu may be separated by our process.

The most effective temperature range appears to be 500–600° C. since runs made at temperatures above 600° C. did not give results, in general, warranting the use of higher temperature. The best results appeared to be obtained when the temperature was gradually raised from 500° C. to 600° C. during the course of the fluorination.

For a still further understanding of the present invention a detailed example is set forth below.

The material of this example from which product, Pu, was to be recovered was subjected to the standard bismuth phosphate procedure including dissolving the metal slugs containing the Pu in nitric acid, reducing the resultant solution after which a bismuth phosphate product precipitation was carried out. This is a precipitation with plutonium under reduced conditions, as Pu$^{(r)}$. The product precipitate was separated and redissolved, and then the solution oxidized and a by-product precipitation carried out by means of bismuth phosphate. This is a precipitation with the plutonium under oxidizing conditions, as Pu$^{(o)}$. The aforementioned cycles were repeated to reduce the contamination to an extent that the materials could be handled without undue danger from radiations. The details of such bismuth phosphate type of treatment have already been described earlier in the present application, hence, repetition is unnecessary.

After the preceding bismuth phosphate treatments had been accomplished to give decontamination and concentration, the Pu was placed in solution in the Pu$^{(r)}$ state and a cerous fluoride product-precipitation accomplished as already described, upon this solution in a reduced condition. This cerous fluoride precipitate easily carried the Pu at high concentrations of Pu. This precipitate, of CeF$_3$ carrying Pu$^{(r)}$ product, was separated by centrifuging and was then ready for treatment by the procedure pertaining particularly to this invention.

Referring now to this procedure, the CeF$_3$ precipitate carrying Pu obtained from the preceding step was dried. Suitable drying may be accomplished by passing dry HF into contact with the precipitate at a temperature between 300° C. to 400° C. for a sufficient period of time dependent upon the initial degree of wetness, bulk of the precipitate, and the like factors.

The treatment of the CeF$_3$ precipitate was accomplished in a Monel metal boat placed within a heated chamber such as shown in the attached drawing. The chamber was provided with an inlet conduit for gas and an outlet conduit comprising an elongated Monel metal tube. After the precipitate had been dried, fluorine gas was introduced into contact with the precipitate for a few hours (about 1–3 hours) while bringing up to and maintaining the temperature between about 500° C.–600° C. The fluorine reacts with the Pu, presumably forming a plutonium fluoride compound designated herein as PuF$_6$. This compound is volatilized and deposits in the outlet tube, on the walls thereof, in the section where the tube is at approximately 225° C. This may be accomplished by controlling the temperature of the cooling medium in 13, around section 9. The fluorine also reacts with any U not removed in preceding steps and carried in the precipitate forming a compound designated as UF$_6$ which compound remains volatile and passes out through outlet conduit without becoming condensed in 9 but may be condensed in 10 by applying low temperature cooling in 14.

After the preceding step was carried out for a few hours, the fluorine introduction was interrupted, the temperature reduced to approximately 300° C. and hydrogen passed into contact with the precipitate remaining. This hydrogen treatment served to break up the precipitate so that better penetration was obtained on resumption of the fluorination treatment. This alternate fluorination and hydrogen treatment was carried out several times. With three fluorine-hydrogen treatments, it was found that more than 85% of the Pu was removed from the cerous fluoride precipitate. As indicated, preferably the temperature employed is between 500° C. and 600° C., the temperature being gradually raised from the lower limit to the higher limit during the fluorination.

The treatment of cerous fluoride precipitate, as above described, is advantageous over the previously proposed processes of treating other materials in view of the possible reaction of $CeF_3$ with fluorine to give $CeF_4$. Due to this reaction, it appears that the crystal structure of the cerous fluoride precipitate is altered sufficiently to facilitate the formation and volatilization of the Pu carried in the precipitate. By the aforementioned reduction treatment, the $CeF_4$ is reduced to $CeF_3$, the alternate reductions and fluorinations presumably giving improved penetration for the purpose of separating the Pu carried within the carrier precipitate. While the foregoing is believed to describe certain aspects of the mechanisms of the process, it is, of course, understood that we do not wish to be bound by any theory of operation.

It has also been found that other precipitates carrying Pu, exemplified by uranous oxalate or uranous hypophosphate, may be treated with fluorine for separating plutonium fluoride which compound deposits out in the exit conduit in the section at a temperature between about 200°–250° C. In these species since U constitutes a component of the carrier there is a substantial amount to volatilize. This volatilized $UF_6$ continues on through the tube after the volatile Pu fluoride has deposited and deposits at a point in the tube at a temperature of about 50° C.–65° C. Various other modifications and changes may be made.

It is to be understood that all matter contained in the above description and examples shall be interpreted as illustrative and not limitative of the scope of this invention, and it is intended to claim the present invention as broadly as possible in view of the prior art.

We claim:

1. An improved process for the recovery of plutonium from a solution containing the same which comprises precipitating cerous fluoride in said solution for effecting carrier precipitation of plutonium, drying the resulting carrier precipitate, and subjecting said precipitate to fluorination within the temperature range between about 500° and 600° C., for separating plutonium from said precipitate by volatilization.

2. In a carrier precipitation process for the decontamination of plutonium, the improved method for the separation, recovery, and concentration of plutonium from a solution containing the same which comprises precipitating cerous fluoride in said solution for effecting carrier precipitation of plutonium, drying the resulting carrier precipitate, subjecting said precipitate to fluorination with a stream of gaseous fluorine within the temperature range between about 500° and 600° C. for separating plutonium as a fluoride from said precipitate by volatilization, and then recovering said volatilized plutonium fluoride by condensation.

3. An improved process for the recovery of plutonium from a solution containing the same which comprises precipitating cerous fluoride in said solution for effecting carrier precipitation of plutonium, drying the resulting precipitate, and subjecting said precipitate to alternate treatments of fluorination at between about 500° and 600° C., and of reduction at a lower temperature, for separating plutonium from said precipitate by volatilization.

4. In a carrier precipitation process for the decontamination of plutonium, the improved method for the separation, recovery, and concentration of plutonium from a solution containing the same together with extraneous material, subsequent to preliminary carrier precipitation decontamination processing, which comprises adding component ions of cerium and fluorine to said solution so as to precipitate cerous fluoride carrying plutonium, drying the precipitate, and subjecting the precipitate to alternate fluorination, at between about 500° and 600° C., and reduction treatments at a lower temperature, for separating plutonium from the precipitate.

5. In a process for the decontamination of plutonium including the carrier precipitation of plutonium with a cerous fluoride carrier precipitate, the improved method for the separation, recovery, and concentration of plutonium from a solution containing the same together with extraneous material, including uranium, which comprises precipitating cerous fluoride in said solution whereupon plutonium and uranium are carried from solution, separating the resulting carrier precipitate from its supernatant solution, drying said precipitate, subjecting said precipitate to alternate treatments of fluorination within the temperature range between about 500° and 600° C. with a stream of gaseous fluorine, and of reduction at a lower temperature with a stream of hydrogen, for separating from said precipitate plutonium and uranium by volatilization as fluorides, and then cooling the vapors containing said plutonium fluoride to a temperature within the range of 200° to 250° C. for preferentially condensing and recovering said plutonium fluoride.

6. An improved process for recovering plutonium from a cerous fluoride carrier precipitate containing the same which comprises subjecting said precipitate, in a dry condition, to alternate treatments of fluorination, at between 500° and 600° C., with a stream of gaseous fluorine, and of reduction at a lower temperature with a stream of hydrogen, for separating plutonium from said precipitate by volatilization as a fluoride.

References Cited in the file of this patent

UNITED STATES PATENTS 2,761,756     Priest _____ Sept. 4, 1956

OTHER REFERENCES

Van Haagen et al.: Journal of the American Chemical Soc., vol. 33, pp. 1504–6 (1911).

Friend: Textbook of Inorganic Chemistry, vol. VII, part III, page 292 (1926).

UNITED STATES PATENT OFFICE
CERTIFICATE OF CORRECTION

Patent No. 2,873,168                      February 10, 1959

Harrison S. Brown et al.

It is hereby certified that error appears in the printed specification of the above numbered patent requiring correction and that the said Letters Patent should read as corrected below.

Column 5, line 40, Example I, in the table, second column thereof, last line, for "580-625" read -- 480-625 --.

Signed and sealed this 1st day of September 1959.

(SEAL)
Attest:

KARL H. AXLINE                     ROBERT C. WATSON
Attesting Officer                 Commissioner of Patents